June 3, 1941.   P. C. KEITH, JR., ET AL   2,243,869
METHOD OF SYNTHESIZING LIQUID HYDROCARBONS
Filed Jan. 26, 1937.
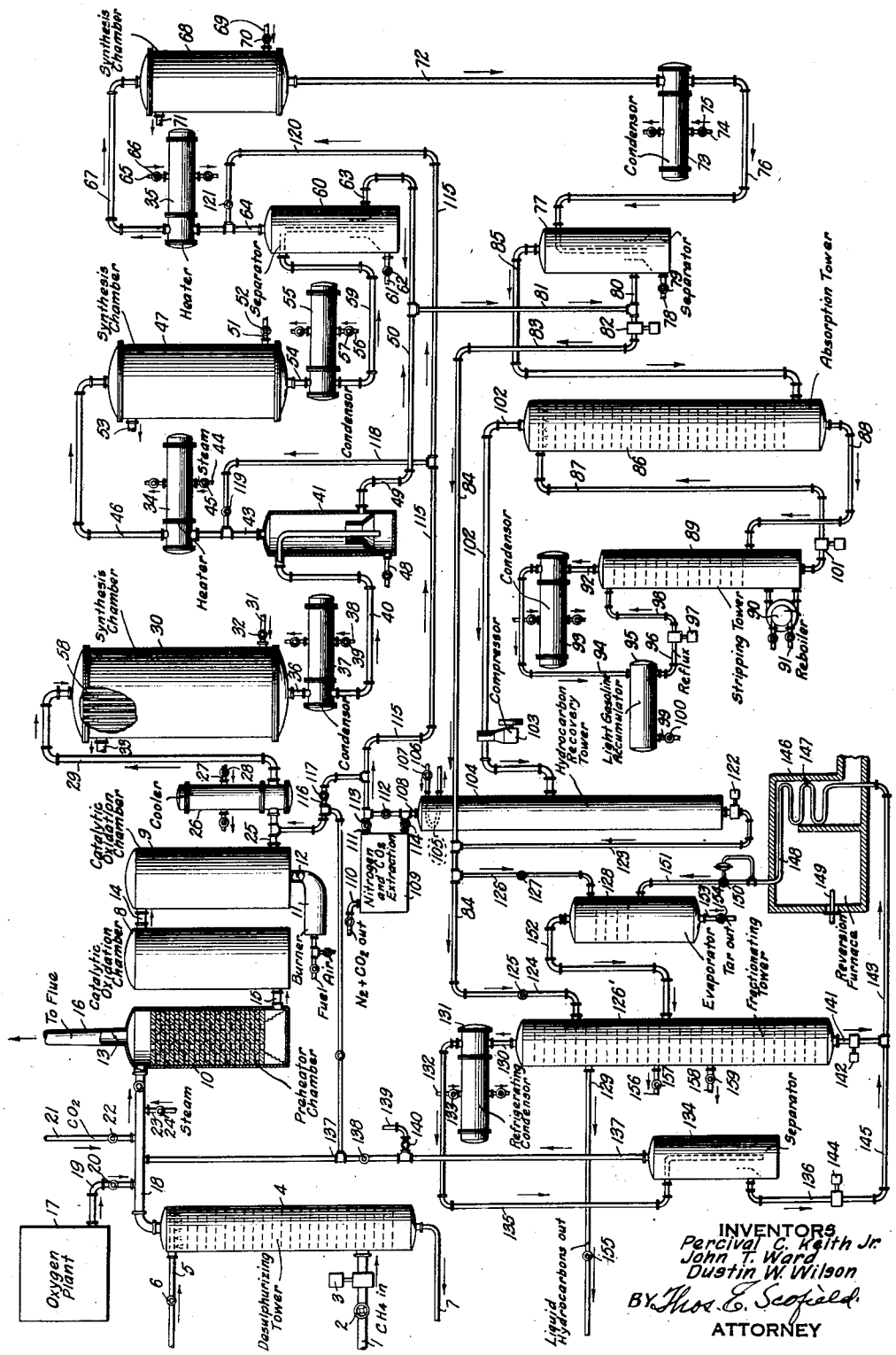
INVENTORS
Percival C. Keith Jr.
John T. Ward
Dustin W. Wilson
BY Thos. E. Scofield
ATTORNEY Patented June 3, 1941

2,243,869

UNITED STATES PATENT OFFICE 2,243,869

METHOD OF SYNTHESIZING LIQUID HYDROCARBONS

Percival C. Keith, Jr., Peapack, and John T. Ward, Union County, N. J., and Dustin W. Wilson, Scarsdale, N. Y., assignors to The M. W. Kellogg Company, New York, N. Y., a corporation of Delaware Application January 26, 1937, Serial No. 122,340

2 Claims. (Cl. 196—10)

Our invention relates to a method of synthesizing liquid hydrocarbons and more particularly to a method of converting methane and like light hydrocarbon gases into hydrocarbons suitable for use as a motor fuel.

It is known to the art that hydrocarbon gases such as propane, butane and the like may be polymerized to form liquid hydrocarbons. The lower boiling hydrocarbons such as methane and ethane, are difficult to polymerize. The polymerization reaction, in the case of these light hydrocarbons, requires such a large quantity of heat that polymerization is commercially unfeasible. Besides there is difficulty in the separation of these materials in form suitable for use in polymerization. The result has been that the daily waste of methane both in the producing fields and at the oil refineries is enormous. For example, in the Texas Panhandle alone, the U. S. Bureau of Mines has estimated that, of the 2,700,000,000 cubic feet of natural gas being produced daily at the beginning of 1935, about 60 per cent was wasted. A large proportion of the waste occurs at wells during production when large quantities of gas are blown into the air. Recent legislation has been enacted restricting the volume of gas which may be passed into the atmosphere. Because of this limitation, natural gasoline producers have been forced to cut their production schedules. Natural gas is principally methane but also contains varying quantities of ethane, propane and nitrogen. Methane is very stable chemically. Chemical inertness or stability can be overcome by the expenditure of energy but, due to the cost of energy, the conversion of methane into liquid fuels by polymerization remains an academic method.

One object of our invention is to provide a method for synthesizing liquid hydrocarbons from light, low boiling, gaseous hydrocarbons, such as methane. For purposes of convenience, we well describe our invention with respect to methane, but it is to be understood that any of the light hydrocarbon gases having three or fewer carbon atoms per molecule are suitable for use in our process.

Another object of our invention is to provide a commercially practicable and economical method of converting methane into liquid hydrocarbons suitable for use as a motor fuel.

Other and further objects of our invention will appear from the following description.

Fischer and Tropsch and others have synthesized hydrocarbons from mixtures of carbon monoxide and hydrogen. In the Fischer-Tropsch process, ordinarly solid fuels such as cokes, semi-cokes or coal are subjected to the water gas reaction to produce a mixture of carbon monoxide and hydrogen, as follows:

$$C+H_2O \rightarrow CO+H_2-28.4 \text{ k. cal.}$$

The water gas thus formed is purified to remove hydrogen sulphide and organically combined sulphur to avoid sulphur poisoning of the catalyst used in the process. The carbon monoxide and hydrogen are then reacted at atmospheric pressure and at a temperature in the vicinity of 200° C. (392° F.) to form liquid hydrocarbons and water in accordance with the following reaction:

$$CO+2H_2 \rightarrow (CH_2)_n+H_2O+48 \text{ k. cal} \text{_____} \quad (I)$$

The catalysts used in the above process are cobalt-thorium-kieselguhr, or nickel-manganese-alumina-kieselguhr or cobalt-thorium-copper-kieselguhr mixtures prepared by the reduction of metallic nitrates with hydrogen.

If the mixture of carbon monoxide and hydrogen subjected to the synthesis is poor in hydrogen, it is necessary to work at higher temperatures and a larger proportion of olefines will be produced. If the mixture of carbon monoxide and hydrogen is rich in hydrogen, it is necessary to work at lower temperatures in order to avoid the production of methane in accordance with the Sabatier methane synthesis.

According to the theoretical reaction in the Fischer synthesis (I), two volumes of hydrogen should be present to one volume of carbon monoxide. Unreacted or inert gases will increase the size both of separating and reacting equipment, since larger volumes will be handled and dilution will disturb equilibrium to such an extent that the speed of reaction is reduced and the extent to which the reaction is carried will be short of what it would be if theoretically proper amounts of the reacting constituents were present.

In copending application of Percival C. Keith, Serial No. 122,613, filed January 27, 1937, there is disclosed a method of forming synthesis gas from methane and other light hydrocarbon gases, which synthesis gas has a ratio of carbon monoxide to hydrogen as one is to two and is thus the theoretically correct mixture for subjection to the Fischer synthesis. It is further disclosed in said copending application that said method may be continuous.

In general, our invention contemplates the oxidation of methane to form mixtures of carbon monoxide and hydrogen and the synthesis of the synthesis gas thus formed into liquid hydrocarbons by means of a catalyst.

The accompanying drawing, which forms part of the instant specification and which is to be read in conjunction therewith, is a diagrammatic view of one form of apparatus capable of carrying out the process of our invention.

More particularly referring now to the drawing, methane from any suitable source (as for example from a natural gasoline plant) passes through line 1 controlled by valve 2 and is pumped if pumping is needed, by pump 3 through a desulphurizing tower 4. The desulphurizing tower may be of any suitable construction. As shown, the methane passes countercurrent to a desulphurizing or sulphur absorbing agent introduced into the tower 4 through line 5 controlled by valve 6 and is withdrawn from the tower through line 7. Triethanolamine, sodium phenolate, diaminoisopropanol, or the like may be used. If desired, sodium hydroxide may be used or combinations of the above methods may be used, it being understood that any of the desulphurizing processes known to the art may be employed, so long as the sulphur content of the methane is reduced to about one tenth of a grain per hundred cubic feet. The removal of sulphur is desirable in order to avoid poisoning of the catalyst and thus reducing the length of time the unit may be on stream.

Let us now consider the following reactions, disclosed in said copending application of Percival C. Keith:

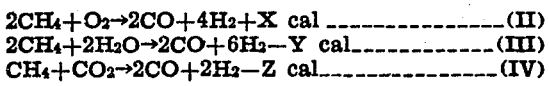

$$2CH_4+O_2 \rightarrow 2CO+4H_2+X \text{ cal} \quad (II)$$
$$2CH_4+2H_2O \rightarrow 2CO+6H_2-Y \text{ cal} \quad (III)$$
$$CH_4+CO_2 \rightarrow 2CO+2H_2-Z \text{ cal} \quad (IV)$$

The above reactions will take place in the vicinity of 1700° F. in the presence of a catalyst comprising nickel deposited on clays of high alumina content, such as fire clay or alundum. Since Reaction II is exothermic and Reactions III and IV are endothermic, the proportions of steam and carbon dioxide may be balanced with respect to oxygen so that the generation of synthesis gas from methane may be accomplished continuously. It will be further observed that Equations III and IV give such amounts of carbon monoxide and hydrogen together that the resultant mixture is synthesis gas in theoretically correct proportion for the Fischer-Tropsch synthesis.

The oxygen can be obtained from the atmosphere by the well known Linde or similar process. Air may be used as a source of oxygen, but this necessitates the passage of large quantities of nitrogen through the equipment, thus increasing the cost of handling and processing. It is understood, of course, that oxygen may be dispensed with entirely and only steam and carbon dioxide employed for converting methane into synthesis gas.

In the drawing, the oxidation chambers are indicated by reference numerals 8 and 9. The chambers may be checkerwork brick on which is deposited the catalyst, or may be if desired, beds of catalytic material through which the gases to be processed may pass. Chamber 10 is a preheater chamber. The chambers 8, 9 and 10 are brought to the desired reaction temperature by means of hot gases of combustion generated for example by surface combustion burner 11. Dampers 12 and 13 are opened and the surface combustion burner operated to pass hot gases of combustion upwardly through chamber 9, then through connection pipe 14, downwardly through chamber 8, then through connection pipe 15 and upwardly through preheater chamber 10, through flue 16. When the chambers have been heated to the desired temperature, that is, from 1800° F. to 2000° F. the burner is shut down and dampers 12 and 13 are closed. The desulphurized methane leaves the desulphurizing tower through pipe 18. Oxygen from the oxygen plant 17 is introduced into pipe 18 through line 19 controlled by valve 20. Carbon dioxide from any suitable source is passed into line 18 through line 21 controlled by valve 22. Steam from any suitable source is passed into line 18 through line 23 controlled by valve 24. The methane, oxygen, steam, and carbon dioxide is passed through preheating chamber 10 and is thus brought to the reaction temperatures of from 1500° F. to 2000° F. by heat exchange with the hot brick work within the chamber. The preheated mixture of gases passes through catalytic oxidation chambers 8 and 9 and Reactions II, III, and IV, described above, take place. Since when oxygen, steam and carbon monoxide are used, it is possible to balance the heat, once the catalytic oxidation chambers are brought to the desired temperature, the oxidation of methane to synthesis gas can be performed continuously. If it is desired to dispense with an oxygen plant, it will be necessary to have a plurality of catalytic oxidation chambers so that one set may be heated to the reaction temperature, while the other set is on stream, and the stream alternately switched to the freshly heated set, while the other is being heated, as is well known in the art in operations using hot checkerwork brick stoves for heating.

It will be understood that there is withdrawn from final catalytic oxidation chamber 9, through line 25, a mixture of carbon monoxide and hydrogen in proportion of two volumes of hydrogen to one volume of carbon monoxide. This mixture will be at a temperature within the range above specified. The mixture is passed through cooler 26 in heat exchange with a cooling medium entering line 27, controlled by valve 28, and reduced to temperatures of from 375° F. to 425° F. which temperatures are those at which the synthesis takes place. The gases reduced to the desired temperature leave the cooler 26 through line 29 and pass downwardly through synthesis chamber 30. This synthesis chamber comprises tubes 58 filled with the contact material and is more fully described in copending application of Dustin W. Wilson, et al., Serial No. 122,654 filed January 27, 1937. The contact material may comprise porous clay or kieselguhr, upon which there is deposited nickel, manganese and alumina or cobalt, thorium and copper, by any manner known to the art, as for example by reduction of reducible compounds of metals.

The temperatures of the reaction should be closely controlled to within 5° C. The reaction, as can readily be seen by reference to Equation I supra, is highly exothermic. In order to remove the heat of reaction and keep the temperature of reaction within the necessary limits, the tubes of contact material are cooled by a cooling medium, for example: water, which enters the synthesis chamber through pipe 31 controlled by valve 32. Steam or other cooling medium is removed from the chamber through line 33 and may be used in heat exchanger operations elsewhere in the plant, as for example in heaters 34 and 35. The products of the synthesis reaction are withdrawn from the synthesis chamber through line 36 and pass through condenser 37 which is cooled by a cooling medium entering through line 38 controlled by valve 39. The mixture of gases and liquid products formed by the synthesis will be cooled to a temperature of about 100° F. in the condenser 37 and are withdrawn therefrom through line 40 and passed into a separator 41. The unconverted carbon monoxide and hydrogen leave the separator through line 43 and are again raised to temperatures of from 375° F. to 425° F. in heater 34 by heat exchange with steam entering through line 44 controlled by valve 45, it being understood of course that the steam for this operation may be obtained from line 33 leaving the synthesis chamber 30. The unreacted gases thus heated to the reaction temperature leave the heater 34 through line 46 and pass into a second synthesis chamber 47 which is of smaller size than synthesis chamber 30, to compensate for the decrease in volume which occurs as the reaction progresses. The water formed by the reaction may be withdrawn from the separator 41 through line 48. The hydrocarbons, some of which will be gasoline boiling within the motor fuel range and some of which will be heavier hydrocarbons, are withdrawn from the separator 41 through line 49 and pass into a manifold 50.

In the synthesis chamber 47, further hydrocarbons are synthesized from the carbon monoxide and hydrogen, the heat of reaction being removed by water entering the heat exchanger synthesis chamber through line 51 controlled by valve 52, steam being removed through line 53. The unreacted gases, liquid hydrocarbons in vapor state, and steam formed, are withdrawn from the synthesis chamber 47 through line 54 and the hydrocarbon vapors and steam are condensed in condenser 55 which is supplied with a cooling medium through line 56 controlled by valve 57 and passed through line 59 into separator 60 from which the condenser water is withdrawn through line 61 controlled by valve 62, the liquid hydrocarbons withdrawn through line 63 and passed into manifold 50, and the unreacted gases withdrawn from the separator through line 64. The unreacted gases comprising carbon monoxide and hydrogen are heated in heater 35 which is supplied with a heating medium such as steam through line 65 controlled by valve 66. As pointed out above, the steam may be obtained from any suitable source, as for example from line 53. In the heater, the unreacted gases are raised to temperatures of from 375° F. to 425° F. The heated gases are withdrawn from the heater 35 through line 67 and passed into the third synthesis chamber 68 which is of similar construction to synthesis chambers 30 and 47 but of smaller size to allow for the decrease in volume occurring in the reaction and the removal of liquid products. The division of the contact material into three parts represented by the three synthesis chambers prolongs the life of the catalyst since this stepwise processing suppresses the formation of hard wax. In addition, the yield of liquid hydrocarbons is increased. The decrease in the volume of gas as the reaction progresses is marked. By progressively decreasing the size of the contact chambers, the contact time in the various stages is kept practically the same so that a continuous process may be readily conducted. The third synthesis chamber is cooled as before by water entering through line 69 controlled by valve 70 and steam is removed through line 71. The hydrocarbon vapors, steam, and unreacted gases are withdrawn from the third synthesis chamber 68 through the line 72 and pass through condenser 73 which is supplied with a cooling medium through line 74 controlled by valve 75. In the condenser 73 the products are cooled to about 100° F. and passed through line 76 into separator 77 from which the water is withdrawn through line 78 controlled by valve 79 and the liquid hydrocarbons withdrawn through line 80 where they are joined by the liquid hydrocarbons from separators 41 and 60, passing from manifold 50 through line 81. The liquid hydrocarbons are then pumped by pump 82 through line 83 to the manifold 84. The unreacted gases withdrawn from separator 77 through line 85 will contain quantities of liquid hydrocarbons in vapor state. These gases therefore are subjected to absorption to remove the liquid components. Any suitable absorption system may be used, as for example charcoal or liquid absorption. In the drawing, we have shown line 85 for passing the gases withdrawn from separator 77 into the absorption tower 86 in which the gases are scrubbed with a lean absorption oil entering the tower through line 87. The rich absorption oil is withdrawn from tower 86 through line 88 and passed to a stripping tower 89 in which the liquid hydrocarbons are stripped from the absorption medium by heat which may be furnished by means of a reboiler 90 supplied with steam from any suitable source, through line 91 controlled by a suitable valve. The absorption oil is thus stripped of its light hydrocarbon fractions, the temperature at the bottom of the tower being controlled so that the light gasoline fractions will be vaporized. These are withdrawn from the tower 89 through line 92, condensed in condenser 93 and passed through line 94 into accumulator 95. From the accumulator a portion of the light gasoline fractions may be removed through line 96 and pumped by pump 97 through line 98 as reflux to control the composition of the light gasoline fractions removed. The light gasoline fractions may be used as a blending stock to furnish the desired light ends in the finished product and bring it to the desired vapor specification. They are withdrawn from the accumulator 95 through line 99 controlled by valve 100. The stripped absorption medium, which may be a light hydrocarbon oil, is pumped by pump 101 through line 87 for reuse in the absorption tower 86. The gases withdrawn from the absorption tower 86 through line 102, which may represent as much as 20 per cent of the original charge, will still contain hydrocarbons such as methane, ethane, ethylene, propane, propylene, butane, butylene and heavier hydrocarbons, as well as unreacted hydrogen and carbon monoxide, and some carbon dioxide.

If air is used as a source of oxygen in the oxidation step, a considerable quantity of nitrogen will also be present. These gases will be compressed in compressor 103 and passed to a hydrocarbon recovery tower 104 under high pressure. The hydrocarbon recovery tower is so controlled that the hydrocarbons propane, propylene, butane and heavier hydrocarbons will be in a liquid state and the hydrogen, methane, ethane, ethylene, carbon monoxide, carbon dioxide and, in some cases nitrogen, will be in the gaseous state. A suitable refrigerant is passed to the reflux condenser 105 in the top of hydrocarbon recovery tower 104 through line 106 controlled by valve 107 and the top tower temperature is so controlled that, under the pressure existing in the hydrocarbon recovery tower 104, the above hydrocarbon fractions will be liquefied and the gases hydrogen, methane, ethane, ethylene, carbon monoxide, carbon dioxide and nitrogen will pass from the tower through line 108 and may be conducted to nitrogen and carbon dioxide extraction plant 109 from which the carbon dioxide and nitrogen are discharged through line 110 and the hydrogen, carbon monoxide and light hydrocarbons removed through line 111, it being understood that valve 112 is closed and valves 113 and 114 are opened. If desired, the nitrogen and carbon dioxide extraction plant may be bypassed by opening valve 112 and closing valves 113 and 114. In either case, the unreacted gases free from nitrogen and carbon dioxide pass into manifold 115. From manifold 115, a portion of the unreacted gases may be passed through line 116 controlled by valve 117 into line 25 for passage into the synthesis chamber 30, a portion may be passed through line 118 controlled by valve 119 for passage with unreacted gases in pipe 43 through the heater 34 to synthesis chamber 47, and a portion may be passed through line 120 controlled by valve 121 to the gases in line 64 passing to the synthesis chamber 68. A connecting line is provided between line 116 and line 137 by means of which the unreacted gases may be returned to the catalytic oxidation chambers 8 and 9 instead of the synthesis chambers. The liquefied hydrocarbons withdrawn from hydrocarbons recovery tower 104 are pumped by pump 122 through line 123 into the manifold 84 joining the synthesized liquid hydrocarbons withdrawn from the separators 41, 60 and 77.

The liquid hydrocarbons in manifold 84 may be passed, in whole or in part, through line 124 controlled by valve 125 into the fractionating tower 126' acting as reflux therefor. A portion of the liquid hydrocarbons may also be bled from manifold 84 through line 126 controlled by valve 127 into the evaporator 128 to assist in the separation in said evaporator, as will hereinafter be more fully pointed out. Hydrocarbons heavier than desired or lighter than desired may be converted by thermal methods to desirable hydrocarbons. The fractionating tower 126' is so operated that hydrocarbons lighter than the desired final product, which is withdrawn therefrom through line 129, will pass from the fractionating tower through line 130, through refrigerating condenser 131, which is supplied with a refrigerating medium, through line 132 controlled by valve 133. The temperature is reduced to about $-40°$ F. so that at the pressures existing in separator 134, the cooled, incondensable gases and vapors passing thereinto through line 135 will be separated so that a liquid comprising the hydrocarbons having three and four carbon atoms per molecule may be withdrawn therefrom through line 136. The gases comprising the lighter hydrocarbons including methane, will be withdrawn from the separator through line 137 controlled by valve 138 and may be passed into line 18 for passage to the light hydrocarbon gas oxidizing step heretofore described. If desired, a portion of these gases may be vented through line 139 controlled by valve 140. The liquid hydrocarbons heavier than those desired are removed from the fractionating tower 126' through line 141 and pumped by pump 142 into line 143 where they are joined by the light normally gaseous hydrocarbons, which may comprise propane, propylene, butane, butylene and some heavier hydrocarbons, being pumped by pump 144 through line 145 into line 143. Line 143 thus carries the hydrocarbons lighter than those desired and the hydrocarbons heavier than those desired and represents the reversion or transition furnace charge. The reversion furnace 146 may be of any suitable design and may comprise, for example, a tube bank 147 heated preponderantly by convection heat, and a tube bank 148 heated preponderantly by radiant heat from burner or burners 149. The reversion furnace is so operated that the hydrocarbons are heated to a temperature of the order of 975° F., pumps 142 and 144 supplying hydrocarbons so that a pressure of the order or one thousand pounds per square inch is maintained. Pressure controlled valve 150 insures that this pressure is maintained. Under these conditions of temperature and pressure a transition of heavier hydrocarbons into lighter hydrocarbons and of lighter hydrocarbons into heavier hydrocarbons will occur.

The products of the transition reaction pass through line 151 into evaporator 128 and are flashed into hydrocarbon vapors and unvaporized oil in evaporator 128 into which a portion of the liquid hydrocarbons from manifold 84 is being introduced through line 126 to assist in the separation and to supply desirable quenching. Since the hydrocarbons being supplied will be in most part vaporizable at the temperatures existing within the evaporator 128, these will form part of the hydrocarbon vapors leaving the evaporator 128 through line 152 for passage to the fractionating tower 126'. The heavy hydrocarbons, which are in a liquid state in the evaporator, are removed from the process through line 153 controlled by valve 154. The desired hydrocarbons are withdrawn from the fractionating tower through line 129 controlled by valve 155. Other and heavier hydrocarbon fractions may be withdrawn, if desired, from the fractionating tower through drawoff 156 controlled by valve 157, and drawoff 158 controlled by valve 159.

It will be observed that we have accomplished the objects of our invention. We have provided a method of converting methane and light hydrocarbon gases normally uneconomical for processing by polymerization, into liquid hydrocarbons suitable for use as a motor fuel.

To produce the carbon monoxide and carbon dioxide for the process it may be desirable to convert heavy hydrocarbons such as tar, fuel oil or asphalt with air or oxygen.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is therefore, to be understood that our invention is not to be limited to the specific details shown and described.

Having thus described our invention, what we claim is:

1. A method of converting light hydrocarbon gases into liquid hydrocarbons including the steps of subjecting a light hydrocarbon gas to a catalytic oxidation reaction at temperatures in excess of 1000° F. to convert it into a mixture of carbon monoxide and hydrogen, synthesizing said mixture of carbon monoxide and hydrogen to liquid hydrocarbons in the presence of a catalyst at temperatures between 375° F. to 425° F.

separating liquid hydrocarbons from gases, separating said gases into unreacted carbon monoxide and hydrogen and gaseous hydrocarbons, subjecting part of said gaseous hydrocarbons to a pyrolytic conversion step at temperatures in the vicinity of 1000° F., fractionating said pyrolytically converted gases in a fractionating zone together with said synthesized liquid hydrocarbons previously separated, withdrawing a portion of the condensate from said fractionating zone as final product desired, withdrawing the heaviest fraction of the condensate from said fractionating zone and subjecting it to pyrolytic conversion, and fractionating the products of said pyrolytic conversion in said fractionating zone.

2. A method of converting light hydrocarbon gases into liquid hydrocarbons including the steps of subjecting a light hydrocarbon gas to a catalytic oxidation reaction at temperatures in excess of 1000° F. to convert it into a mixture of carbon monoxide and hydrogen, synthesizing said mixture of carbon monoxide and hydrogen to liquid hydrocarbons in the presence of a catalyst at temperatures between 375° F. to 425° F., separating the products of said synthesis step into liquid hydrocarbons and gases, subjecting said gases to an absorption step to remove hydrocarbons, removing said gases from the absorption step and separating them into unreacted carbon monoxide and hydrogen and hydrocarbon gases, recycling said unreacted carbon monoxide and hydrogen to said synthesis step, separating said separated hydrocarbon gases into light hydrocarbon gases and heavy hydrocarbon gases, recycling said light hydrocarbon gases to said catalytic oxidation step, subjecting the heavy hydrocarbon gases to a pyrolytic conversion step to convert them into liquid hydrocarbons, fractionating said converted hydrocarbon gases in a fractionating zone together with synthesized liquid hydrocarbons previously separated in the process, withdrawing a side stream from said fractionating zone as the desired product, and subjecting the heavier fractions from the fractionating zone to a pyrolytic conversion step and fractionating the converted heavier fractions in said fractionating zone.

PERCIVAL C. KEITH, Jr.
JOHN T. WARD.
DUSTIN W. WILSON.

CERTIFICATE OF CORRECTION.

Patent No. 2,243,869. June 3, 1941.

PERCIVAL C. KEITH, JR., ET AL.

It is hereby certified that error appears in the printed specification of the above numbered patent requiring correction as follows: Page 1, first column, line 42, for the word "well" read --will--; and second column, line 1, for "ordinarly" read --ordinarily--; page 2, second column, line 61, for "temperatures" read --temperature--; page 3, first column, line 41, for the word "condenser" read --condensed--; page 4, first column, line 32, for "hydrocarbons" read --hydrocarbon--; same page, second column, line 14, for "order or" read --order of--; and that the said Letters Patent should be read with this correction therein that the same may conform to the record of the case in the Patent Office.

Signed and sealed this 5th day of August, A. D. 1941.

(Seal)

Henry Van Arsdale,
Acting Commissioner of Patents.